H. M. BOE.
GREASE OR OIL DISPENSING APPARATUS.
APPLICATION FILED MAY 27, 1922.
Reissued Aug. 1, 1922. 15,427.
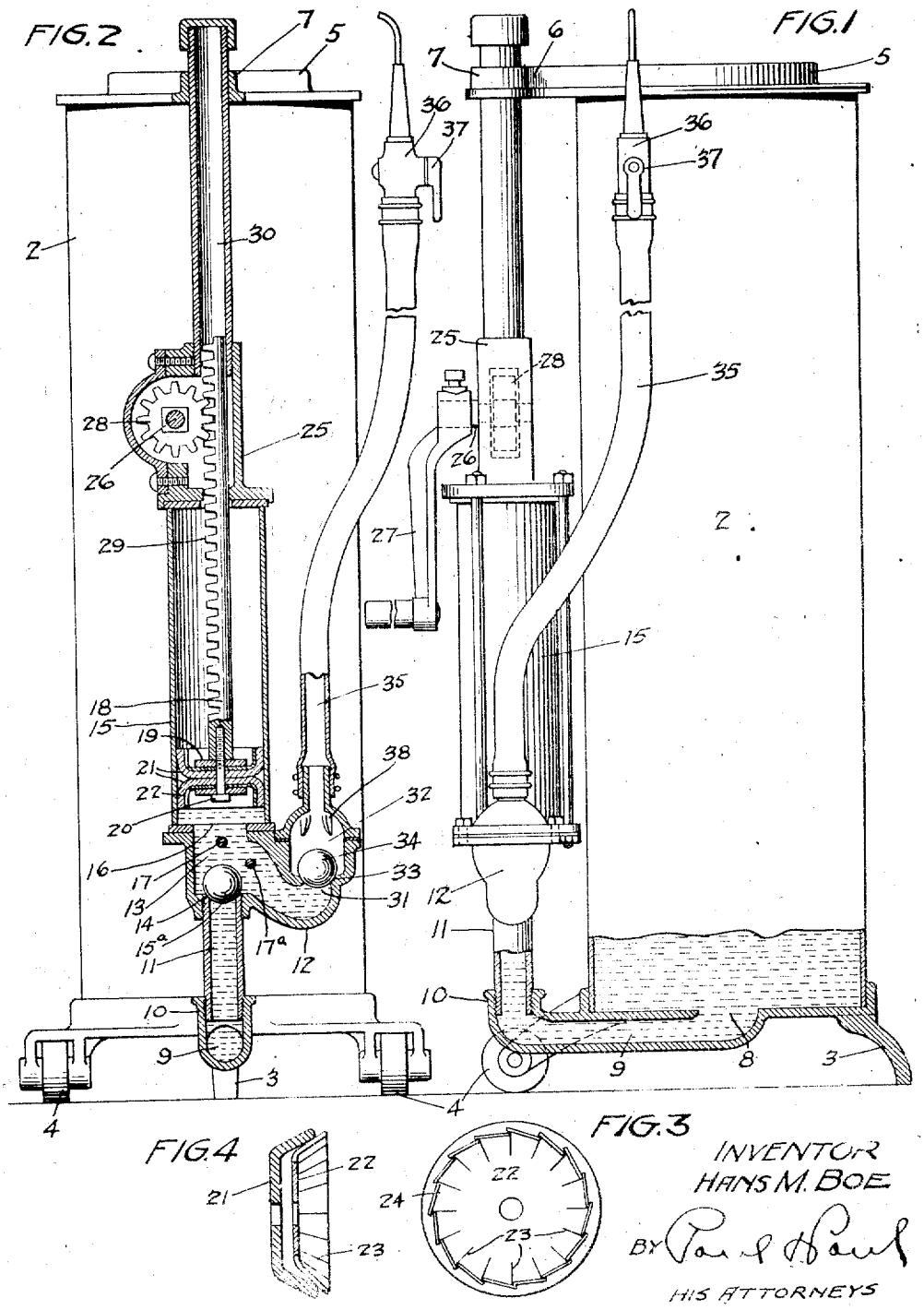

UNITED STATES PATENT OFFICE.

HANS M. BOE, OF MINNEAPOLIS, MINNESOTA.

GREASE OR OIL DISPENSING APPARATUS.

15,427. Specification of Reissued Letters Patent. Reissued Aug. 1, 1922.

Original No. 1,369,517, dated February 22, 1921, Serial No. 282,139, filed March 12, 1919. Application for reissue filed May 27, 1922. Serial No. 564,251.

*To all whom it may concern:*

Be it known that I, HANS M. BOE, a citizen of the United States, resident of Minneapolis, county of Hennepin, State of Minnesota, have invented certain new and useful Improvements in Grease or Oil Dispensing Apparatus, of which the following is a specification.

The object of my invention is to provide an attachment for a grease or oil tank or container by means of which lubricant can be drawn out of the tank and discharged through a suitable nozzle into a bearing, differential or any other device where the lubricating material is needed.

A further object is to provide an apparatus which will be simple and inexpensive in construction and easily operated.

Other objects of the invention will appear from the following detailed description.

The invention consists generally in various constructions and combinations, all as hereinafter described and particularly pointed out in the claims.

In the accompanying drawings forming part of this specification,

Figure 1 is a side view, partially in section, of a dispensing apparatus with my invention applied thereto, Figure 2 is a vertical sectional view through the tank attachment, Figures 3 and 4 are detail views, showing the metallic disk for holding the piston cups in place.

In the drawing, 2 represents a tank or container having a leg 3 and caster supports 4 on which the tank is moved conveniently from place to place. 5 is a cover, suitably secured to the top of the tank and provided on one side with a projecting bracket 6 having a vertical socket 7 therein. At the bottom of the tank is an outlet or discharge port 8 leading to a passage 9 which terminates in an elbow 10 into which a nipple 11 is tapped. 12 represents a pump head, connected with the other end of the nipple and containing a chamber 13, the nipple having a seat 14 for a ball valve 15ª which normally rests by gravity on the seat and closes the nipple. A pump barrel 15 is seated on the top of the pump head 12 and communicates therewith through a passage 16, a pin 17 being mounted in the walls of said head and bridging said passage to prevent the valve 15ª from being drawn up into the barrel on the upstroke of the plunger. A pin 17ª is also provided in the wall of the head 12 to limit the movement of the ball valve 15ª toward the discharge port of the head. A piston rod 18 is mounted in said barrel and has a head 19 at its lower end that is tapped to receive a bolt 20 and piston cups 21 are placed back to back on said bolt and seated against said head, being clamped securely thereon by the tightening of said bolt. These cups are preferably of leather or some other suitable flexible material and their edges are held in contact with the inner walls of the barrel by suitable means, preferably the metallic disks 22, preferably of brass, having radial slits 23 in their edges to form a series of spring-like tongues 24 which, when the edge of the disk is folded, lap one another slightly on one side, as indicated in Figure 3, and have the function of holding the flexible edges of the cups against the walls of the barrel with a yielding pressure. The disks are made and pressed outwardly on the cups when the clamping bolt is tightened and the disks and cups drawn together.

In making these brass disks, I cut a series of radial slits in the edges thereof and then, when the disk is folded to the form shown in Figure 4, the abutting edges of the disks will slide by each other, said edges being slightly offset in the act of cutting the slits, so that it is only necessary to fold the disk to the form shown in Figure 4, when the tongues 24 will assume the position illustrated in Figure 3. These disks I regard as an important feature of the invention.

Above the barrel 15 is a housing 25 in which a shaft 26 having an operating handle 27 is journaled and a pinion 28 is mounted on said shaft to engage the teeth 29 of the piston rod 18. A hollow guide 30 is provided above the housing 25, forming a continuation of the barrel 15 and consists preferably of a section of pipe inserted into the socket 7 and held rigidly thereby in line with the barrel to receive the rod 18 when the piston is raised by the movement of the operating crank 27. The plunger rod and its rack are wholly enclosed by the barrel and the hollow guide 30 and are thereby made dirt and dust-proof, and the upper end of the pipe 30, radially mounted in the cover 5, serves as a convenient handle for moving the tank from place to place. By mounting the piston rod in this way I not only thoroughly protect it but avoid the necessity of projecting the rod a considerable distance above the tank, as frequently is done in pump attachments of this kind.

The head 12 has a port 31 therein communicating with a chamber 32 and provided with a seat 33 for a ball valve 34 which normally rests by gravity on said seat and closes the port. A section of hose 35 is connected with the chamber 32 and is provided with a nozzle 36 and a controlling valve 37. The wall of the chamber 32 is provided with prongs or stops 38 in the path of the ball 34 to arrest movement of the ball when it is raised from its seat by the pressure of the lubricating material and allow such material to flow around the ball into the hose section 35 and from thence to the nozzle and be discharged. This head and its connections are of ordinary pump construction to which I make no claim.

In operation, the crank 27 is revolved to raise the plunger. The valve 15ª is thereby lifted from its seat and a quantity of the lubricating material is drawn from the tank up into the barrel 15, the valve 34 being closed at this time. As soon as the suction of the plunger ceases, the valve 15ª will return to its seat and be forced thereon when the piston begins its downward movement and the lubricating material accumulated in the barrel will flow down through the chamber 13 and up through the port 31 into the chamber 32 and from thence to the nozzle, the rapidity of the discharge depending, of course, upon the speed of descent of the plunger.

During the movement of the plunger the spring discs 22 through their yielding contact with the flexible cups 21, will form a close joint between said cups and the walls of the barrel and insure the piston performing its proper function in the operation of the pump. The amount of lubricant discharged may be approximately determined by the stroke of the pump. I do not, however, rely upon this means for determining the quantity of lubricant discharged, as provision is made in the tank 2 through the medium of a piston in the tank and an indicator on the cover 5 (not shown) through the movement of which the discharge of lubricant from the tank is accurately measured. This piston and indicator form the subject matter of prior applications for U. S. patents filed by me and I make no claim therefore to these devices in this case and have not thought it necessary to incorporate them in the drawings.

I claim as my invention:

1. The combination, with a tank adapted to contain a lubricant and having a discharge passage at its lower end and a pipe connection therefor, of a pump having means at its lower end for communication with said pipe connection and provided with a barrel and piston and rod therein, a pipe forming an upward continuation of said barrel concentric therewith and having a bearing at its upper end on said tank and forming a convenient handle for moving the tank, said pump also having a hose connection and nozzle therefor and suitable valves and means for reciprocating said piston rod and piston in said barrel and pipe to fill and empty said barrel.

2. The combination, with a tank adapted to contain a lubricant and having a discharge port in its bottom, of a pump arranged outside the walls of said tank and adjacent thereto and having a pipe connection at its lower end with said port, a pump barrel mounted on said pipe connection, a hollow guide forming a vertical continuation of said pump barrel and having its upper end rigidly mounted in the top of said tank, a piston in said barrel having a toothed rod slidable in said guide and concealed and protected thereby, a shaft mounted near said barrel and having a pinion engaging the teeth of said rod and an operating crank for said shaft, a hose connected with the lower portion of said pump and having a discharge nozzle and valves for regulating the delivery of the lubricant from said tank to said barrel and to said hose when said piston is reciprocated.

3. The combination, with a portable tank adapted to contain a lubricant and having a discharge passage at its lower end and a pipe connection therefor, of a pump having means at its lower end for communication with said pipe connection and provided with a barrel and piston and rod therein, a guide for said rod forming an upward continuation of said barrel and having a bearing at its upper end on said tank and forming a convenient handle for moving said tank, said pump also having a hose connection and nozzle therefor and suitable valves and means for reciprocating said piston rod and piston in said barrel and guide to fill and empty said barrel.

4. The combination, with a portable tank adapted to contain a lubricant and having a discharge port, of a pump arranged outside the walls of said tank and adjacent thereto and having a pipe connection at its lower end with said port, a pump barrel mounted on said pipe connection, a guide connected with said barrel and secured to the cover of said tank and forming a hand grip for moving said tank, a piston in said barrel having a rod slidable in said guide, a pinion geared to said rod and having an operating crank, a hose connected with the lower portion of said pump and having a discharge nozzle, and valves for regulating the delivery of the lubricant from said tank to said barrel and to said hose when said piston is reciprocated.

5. The combination, with a tank adapted to contain a lubricant, of a pump arranged outside the walls of said tank and adjacent thereto and having a pipe connection for withdrawing the contents of the latter, said pump including a barrel mounted on said pipe connection, a tubular guide connected with said barrel and forming a hand grip, a piston in said barrel having a rod slidable in said guide, a pinion geared to said rod and having an operating crank, a discharge duct connected with the lower portion of said pump, and valves for regulating the delivery of the lubricant from said tank to said barrel and to said discharge duct when said piston is reciprocated.

6. The combination, with a tank adapted to contain a lubricant, of a pump arranged outside the walls of said tank and adjacent thereto and having a pipe connection for withdrawing the contents of the latter, said pump including a barrel mounted on said pipe connection, a hollow guide projecting upwardly from said barrel adjacent the walls of said tank and forming a hand grip, a piston in said barrel having a rod slidable in said guide, a pinion geared to said rod and having an operating crank, a discharge duct connected with the lower portion of said pump, and valves for regulating the delivery of the lubricant from said tank to said barrel and to said discharge duct when said piston is reciprocated.

7. The combination, with a portable tank adapted to contain a lubricant, of a pump arranged outside the walls of said tank and adjacent thereto and having a pipe connection for withdrawing the contents of the latter, said pump including a barrel mounted on said pipe connection, a hollow guide connected with said barrel and forming a hand grip, a piston in said barrel having a rod slidable in said guide and provided with rack teeth, a pinion meshing with said teeth and having an operating crank, a discharge duct connected with the lower portion of said pump and valves for regulating the delivery of the lubricant from said tank to said barrel and to said discharge duct when said piston is reciprocated.

8. The combination, with a tank adapted to contain a lubricant, of a pump arranged outside the walls of said tank and adjacent thereto and having a pipe connection for withdrawing the contents of the latter, said pump including a barrel mounted on said pipe connection, a hollow guide connected with said barrel and forming a hand grip and having dust-proof walls, a piston in said barrel having a rod slidable in said guide, a pinion geared to said rod and having an operating crank, a discharge duct connected with the lower portion of said pump and valves for regulating the delivery of the lubricant from said tank to said barrel and to said discharge duct when said piston is reciprocated.

9. The combination, with a receptacle adapted to contain a lubricant, of a pump arranged outside the walls of said receptacle and having a pipe connection for withdrawing the contents of the latter, said pump including a barrel mounted on said pipe connection, a guide connected with said barrel and forming a hand grip, a piston in said barrel having a rod slidable in said guide, a pinion geared to said rod and having an operating crank, a discharge duct connected with the lower portion of said pump and valves for regulating the delivery of the lubricant from said receptacle to said barrel and to said discharge duct when said piston is reciprocated.

HANS M. BOE.